(No Model.)
J. M. AKERS.
BICYCLE LOCK.
No. 565,658. Patented Aug. 11, 1896.
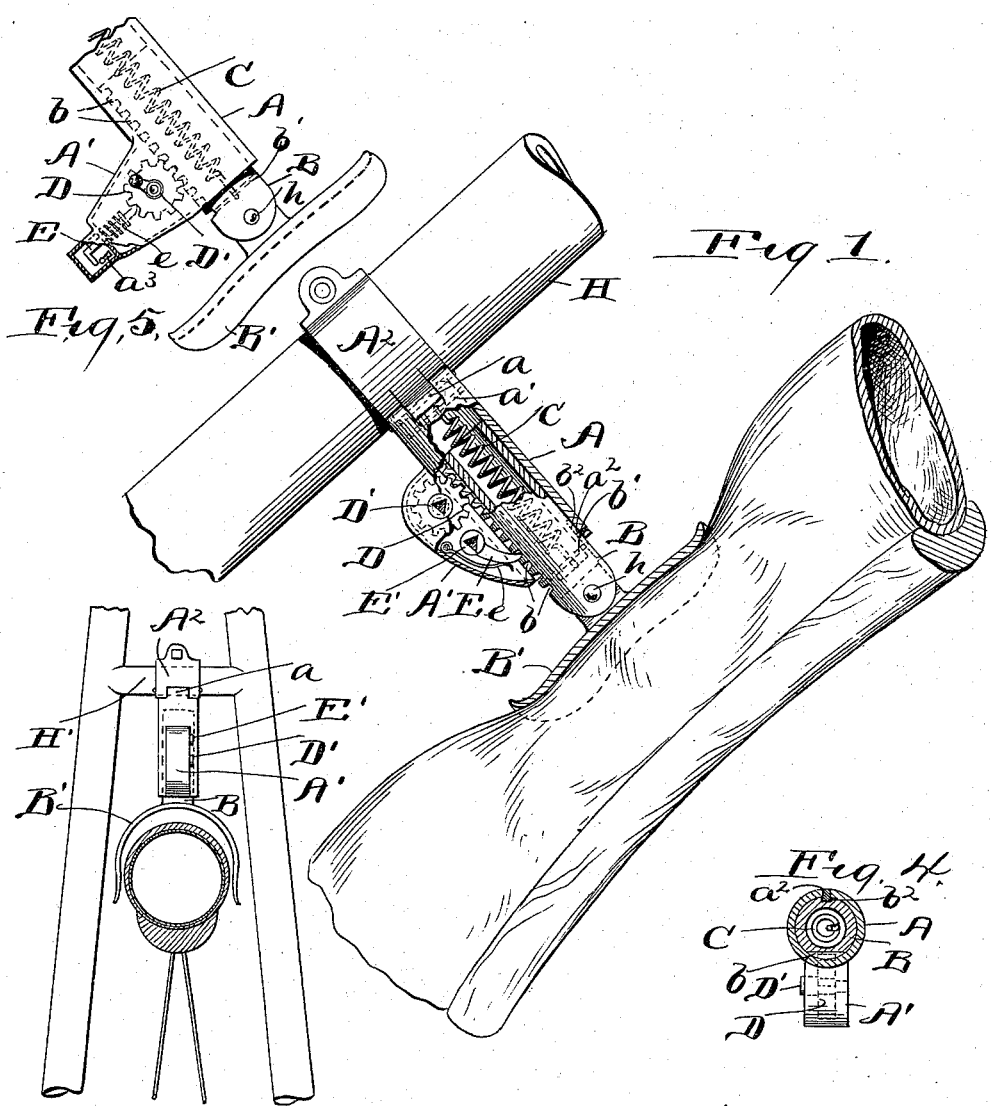
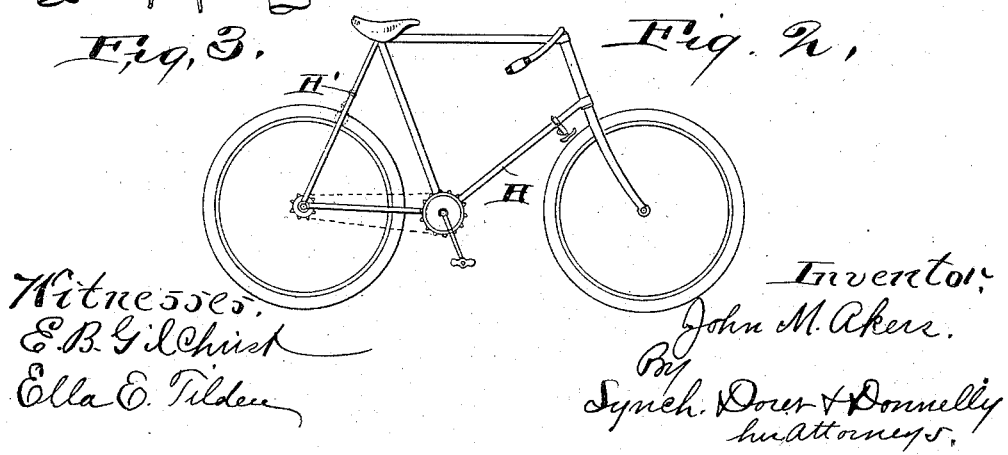
Witnesses:
E. B. Gilchrist
Ella E. Tilden
Inventor:
John M. Akers.
By Lynch, Doer & Donnelly
his attorneys.

UNITED STATES PATENT OFFICE.

JOHN M. AKERS, OF CLEVELAND, OHIO.

BICYCLE-LOCK.

SPECIFICATION forming part of Letters Patent No. 565,658, dated August 11, 1896.

Application filed March 9, 1896. Serial No. 582,305. (No model.)

*To all whom it may concern:*

Be it known that I, JOHN M. AKERS, of Cleveland, Cuyahoga county, Ohio, have invented certain new and useful Improvements in Bicycle-Locks; and I do hereby declare the following to be a full, clear, and exact description of the invention, such as will enable others skilled in the art to which it pertains to make and use the same.

My invention relates to locks for bicycles, and more especially such locks as are attached to or form a part of the frame of the bicycle.

My invention consists in the peculiar construction and operation of said lock, as will be hereinafter fully set forth and claimed.

In the drawings, Figure 1 is a view in side elevation, partly in section, of a lock embodying my invention, and also showing one manner of securing the lock to the frame of a bicycle. Fig. 2 is a skeleton view of a bicycle with my improved lock attached, showing the two positions in which it may be located, so as to lock either the front or rear wheel. Fig. 3 is a view in rear elevation of a portion of a bicycle, showing my improved lock secured to the cross-piece of the rear fork, just above the rear wheel, and in position to lock said wheel, and also showing certain modifications necessitated by thus locating the lock. Fig. 4 is a sectional view showing the groove and pin for keeping the plunger from revolving in the barrel or case. Fig. 5 illustrates a modified construction, showing another mode of locating and constructing the pawl.

A represents the barrel or case of my improved lock, which is provided at its side with a projecting chamber A′, in which the plunger operating and controlling mechanism is contained, and through which this mechanism is operated, as will be hereinafter fully explained. The barrel or case A is also provided, at one end, with a clamp A² for securing the lock to the frame of a bicycle. This clamp may, if desired, have one of its sides hinged, as at $a$, so that the lock may be attached to bicycles already in use. The interior of the clamp may also be lined with some soft material. However, this clamp is not absolutely essential to my invention, inasmuch as the barrel or case may be secured in the desired position on the bicycle-frame in any suitable manner, by brazing or otherwise.

B represents the plunger (which may be called the "bolt") of the lock. The outer end of plunger B is provided with a shoe or clamp B′ for engaging or embracing the tire of a bicycle-wheel. The plunger B is also provided with a rack $b$, which may be formed integral with the plunger or secured thereto in any suitable manner. I have shown it formed integral and prefer to so construct it.

C represents a spiral spring, one end of which is secured to the barrel or case A by means of a pin $a'$ or otherwise. The other end of the spring C is secured in the interior of the plunger B by a pin $b'$, as shown, or in any other suitable manner. The tension of spiral spring C is such as to always tend to retract the plunger B. The plunger B is provided with a slot $b^2$ and the barrel A with a pin $a^2$, which enters the slot $b^2$ and keeps the plunger from rotating or turning in barrel A.

The plunger operating and controlling mechanism is constructed as follows: D represents a pinion, which is mounted in chamber A′ on a short shaft D′, the pinions being so secured to the shaft as to be revolved by it. The pinion D meshes with rack $b$ on plunger B. Thus when the pinion is revolved in the proper direction the plunger is forced out.

E represents a pawl which is mounted in the chamber A′ and which may be mounted on shaft E′, as shown in Fig. 1, said shaft being so connected to pawl E as to move with and operate to disengage it when a key is inserted in the shaft and turned. The pawl may, if desired, be formed, located, and operated as shown in Fig. 5, in which the pawl is shown as consisting of a short metallic rod E, having its engaging end provided with a chisel-point and adapted to lock the teeth of pinion D, being kept in engagement with said teeth by means of spiral spring.

The upper or outer end of pawl E in Fig. 5 is bent at a right angle to the stem and in connection with the bit of a key acts as a means for disengaging the said pawl. The key is inserted through the keyhole $a^3$. Pawl E engages the teeth of rack $b$ or pinion D by being forced against either by spring $e$, and holds the plunger against the retractive action of a spring C, and also in any position in which said plunger may be forced by pinion D. When the pawl is disengaged from the rack or pinion, the retractive force of the spring C pulls the plunger back into the barrel A.

In the construction shown in Fig. 1 the shaft D' and the shaft E' are both provided with means for engagement with a suitable key through the medium of which the said shafts and the attached pinion and pawl E may be operated. In the construction shown in Fig. 5 the pinion-shaft is preferably operated by a crank. The lock is secured, as shown, in any suitable manner to either the lower front brace-lever H or to the cross-bar H' of the rear fork in such position as to be opposite either the front wheel or the rear wheel, and to engage either, as the case may be. In order that the shoe B' may accommodate itself to the tire when the lock is secured to the front brace-bar H, it is hinged to the plunger at $h$, as shown. When the lock is secured to the cross-bar H' of the rear fork, it is not necessary to hinge the shoe to the plunger, inasmuch as the lock may be adjusted so as to adapt the shoe to the rear wheel. I also form shoe B' in the form of a clamp, as shown, so as to partly embrace the tire when the wheel is locked. The lock, after being placed in position as desired, or as is necessary, is operated by engaging a key or crank with the shaft D' and turning the pinion to the right until the necessary contact is made with the wheel, as shown in Figs. 1 and 4. It will be noticed that as the pinion is revolved and the plunger B advances the pawl E engages the teeth of the rack $b$ one after the other, and thus locks said plunger as it advances and prevents its being retracted or pushed back into the barrel A, and hence no matter what the distance may be between the end of the barrel and the tire the plunger locks the shoe or clamp against the tire by means of the pawl. To unlock or disengage the shoe or clamp from the wheel, the key is engaged with the shaft E' or the pawl and turned to the right, which will disengage the pawl from the teeth of the rack $b$ and allow the spring C to retract the plunger B. In case of the spring C becoming broken the lock will work and the plunger be held in place by means of the pawl E, either out or in.

What I claim is—

1. A lock for bicycles comprising in its construction a barrel or casing provided with means for attaching it to the frame of a bicycle, of a hollow plunger containing a retracting-spring, one end of which is fastened to the barrel or casing, and the other to the plunger, said plunger being also provided with an exteriorly-located rack which engages with a pinion whereby the plunger is projected, and a pawl or equivalent device for locking said plunger as it is projected, substantially as and for the purpose set forth.

2. In a lock for bicycles consisting of a barrel or casing adapted to be secured to a bicycle-frame and provided with a projecting chamber A' containing a pinion and locking device, the hollow plunger B, containing spring, C, secured at one end to the bottom of said plunger and at the other to the barrel or casing, and provided with rack $b$ formed integral with said plunger, the slot $b^2$ adapted to receive pin $a^2$, thus preventing rotary motion, and said plunger also provided, at its lower end, with a clamp or shoe for engaging the tire, substantially as and for the purpose set forth.

In testimony whereof I sign this specification, in the presence of two witnesses, this 5th day of March, 1896.

JOHN M. AKERS.

Witnesses:
W. E. DONNELLY,
ELLA E. TILDEN.